United States Patent
Weckel et al.

(10) Patent No.: US 6,987,805 B1
(45) Date of Patent: Jan. 17, 2006

(54) MACROBLOCK LEVEL INTRAREFRESH TECHNIQUE FOR ENCODED VIDEO

(75) Inventors: Charles Weckel, Cupertino, CA (US); Hervé Brelay, San Jose, CA (US); Feng-Ming Wang, Milpitas, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/405,901

(22) Filed: Sep. 24, 1999

(51) Int. Cl.
*H04B 1/66* (2006.01)

(52) U.S. Cl. ............ 375/240; 375/240.24; 375/240.13; 375/240.08; 382/236; 382/243; 382/248; 348/699

(58) Field of Classification Search ................ 375/240, 375/240.13, 240.12, 240.15, 240.16, 240.24, 375/240.08; 382/236, 243, 248; 348/609
See application file for complete search history.

(56) References Cited

U.S. PATENT DOCUMENTS

| 5,719,628 A | * | 2/1998 | Ohki ........................ 348/402.1 |
| 6,574,277 B1 | * | 6/2003 | Miyamoto ............. 375/240.13 |

\* cited by examiner

*Primary Examiner*—Shawn S. An
(74) *Attorney, Agent, or Firm*—Christopher P. Maiorana, P.C.

(57) ABSTRACT

A method is provided for encoding K>1 sequentially presented video pictures. Each of the K pictures is divided into an m>1 row×n>1 column array of non-overlapping coding units of equal sizes. Each coding unit occupies a respective coding unit position in the picture from which it was divided. An arbitrary, pseudo random pattern of coding units is selected for refreshing during each of the K pictures. Each pattern selected during any given one of the K pictures includes a sequence of one or more coding units of the array. In addition, the pixels of each coding unit selected for refreshing during a $k^{th}$ picture occupy different pixel positions than each coding unit selected for refreshing during a preceding one of the $1^{st}$ to $(k-1)^{th}$ pictures of the K pictures. Furthermore, each pixel position of a moving picture image formed from the K pictures is selected for refreshing once over the sequence of K pictures.

A system for encoding includes a source of the K pictures and an intra/inter decision circuit for selecting the coding units for refreshing over the sequence of K frames. The method or system produces an encoded signal which can be stored on a storage medium. A method and system for decoding the encoded signal is also provided.

23 Claims, 4 Drawing Sheets

| 1 | 1 | 1 | 33 | 33 | 33 | 32 | 32 | 32 | 31 | 31 | 31 | 30 | 30 | 30 | 29 | 29 | 29 | 28 | 28 |
|---|---|---|---|---|---|---|---|---|---|---|---|---|---|---|---|---|---|---|---|
| 28 | 27 | 27 | 27 | 26 | 26 | 26 | 25 | 25 | 25 | 24 | 24 | 24 | 23 | 23 | 23 | 22 | 22 | 22 | 21 |
| 21 | 21 | 20 | 20 | 20 | 19 | 19 | 19 | 18 | 18 | 18 | 17 | 17 | 17 | 16 | 16 | 16 | 15 | 15 | 15 |
| 14 | 14 | 14 | 13 | 13 | 13 | 12 | 12 | 12 | 11 | 11 | 11 | 10 | 10 | 10 | 9 | 9 | 9 | 8 | 8 |
| 8 | 7 | 7 | 7 | 6 | 6 | 6 | 5 | 5 | 5 | 4 | 4 | 4 | 3 | 3 | 3 | 2 | 2 | 2 | 1 |
| 1 | 1 | 33 | 33 | 33 | 32 | 32 | 32 | 31 | 31 | 31 | 30 | 30 | 30 | 29 | 29 | 29 | 28 | 28 | 28 |
| 27 | 27 | 27 | 26 | 26 | 26 | 25 | 25 | 25 | 24 | 24 | 24 | 23 | 23 | 23 | 22 | 22 | 22 | 21 | 21 |
| 21 | 20 | 20 | 20 | 19 | 19 | 19 | 18 | 18 | 18 | 17 | 17 | 17 | 16 | 16 | 16 | 15 | 15 | 15 | 14 |
| 14 | 14 | 13 | 13 | 13 | 12 | 12 | 12 | 11 | 11 | 11 | 10 | 10 | 10 | 9 | 9 | 9 | 8 | 8 | 8 |
| 7 | 7 | 7 | 6 | 6 | 6 | 5 | 5 | 5 | 4 | 4 | 4 | 3 | 3 | 3 | 2 | 2 | 2 | 1 | 1 |
| 1 | 33 | 33 | 33 | 32 | 32 | 32 | 31 | 31 | 31 | 30 | 30 | 30 | 29 | 29 | 29 | 28 | 28 | 28 | 27 |
| 27 | 27 | 26 | 26 | 26 | 25 | 25 | 25 | 24 | 24 | 24 | 23 | 23 | 23 | 22 | 22 | 22 | 21 | 21 | 21 |
| 20 | 20 | 20 | 19 | 19 | 19 | 18 | 18 | 18 | 17 | 17 | 17 | 16 | 16 | 16 | 15 | 15 | 15 | 14 | 14 |
| 14 | 13 | 13 | 13 | 12 | 12 | 12 | 11 | 11 | 11 | 10 | 10 | 10 | 9 | 9 | 9 | 8 | 8 | 8 | 7 |
| 7 | 7 | 6 | 6 | 6 | 5 | 5 | 5 | 4 | 4 | 4 | 3 | 3 | 3 | 2 | 2 | 2 | 1 | 1 | 1 |

FIG. 5

| 1 | 1 | 1 | 33 | 33 | 33 | 32 | 32 | 32 | 31 | 31 | 31 | 30 | 30 | 30 | 29 | 29 | 29 | 28 | 28 |
|---|---|---|---|---|---|---|---|---|---|---|---|---|---|---|---|---|---|---|---|
| 28 | 27 | 27 | 27 | 26 | 26 | 26 | 25 | 25 | 25 | 24 | 24 | 24 | 23 | 23 | 23 | 22 | 22 | 22 | 21 |
| 21 | 21 | 20 | 20 | 20 | 19 | 19 | 19 | 18 | 18 | 18 | 17 | 17 | 17 | 16 | 16 | 16 | 15 | 15 | 15 |
| 14 | 14 | 14 | 13 | 13 | 13 | 12 | 12 | 12 | 11 | 11 | 11 | 10 | 10 | 10 | 9 | 9 | 9 | 8 | 8 |
| 8 | 7 | 7 | 7 | 6 | 6 | 6 | 5 | 5 | 5 | 4 | 4 | 4 | 3 | 3 | 3 | 2 | 2 | 2 | 1 |
| 1 | 1 | 33 | 33 | 33 | 32 | 32 | 32 | 31 | 31 | 31 | 30 | 30 | 30 | 29 | 29 | 29 | 28 | 28 | 28 |
| 27 | 27 | 27 | 26 | 26 | 26 | 25 | 25 | 25 | 24 | 24 | 24 | 23 | 23 | 23 | 22 | 22 | 22 | 21 | 21 |
| 21 | 20 | 20 | 20 | 19 | 19 | 19 | 18 | 18 | 18 | 17 | 17 | 17 | 16 | 16 | 16 | 15 | 15 | 15 | 14 |
| 14 | 14 | 13 | 13 | 13 | 12 | 12 | 12 | 11 | 11 | 11 | 10 | 10 | 10 | 9 | 9 | 9 | 8 | 8 | 8 |
| 7 | 7 | 7 | 6 | 6 | 6 | 5 | 5 | 5 | 4 | 4 | 4 | 3 | 3 | 3 | 2 | 2 | 2 | 1 | 1 |
| 1 | 33 | 33 | 33 | 32 | 32 | 32 | 31 | 31 | 31 | 30 | 30 | 30 | 29 | 29 | 29 | 28 | 28 | 28 | 27 |
| 27 | 27 | 26 | 26 | 26 | 25 | 25 | 25 | 24 | 24 | 24 | 23 | 23 | 23 | 22 | 22 | 22 | 21 | 21 | 21 |
| 20 | 20 | 20 | 19 | 19 | 19 | 18 | 18 | 18 | 17 | 17 | 17 | 16 | 16 | 16 | 15 | 15 | 15 | 14 | 14 |
| 14 | 13 | 13 | 13 | 12 | 12 | 12 | 11 | 11 | 11 | 10 | 10 | 10 | 9 | 9 | 9 | 8 | 8 | 8 | 7 |
| 7 | 7 | 6 | 6 | 6 | 5 | 5 | 5 | 4 | 4 | 4 | 3 | 3 | 3 | 2 | 2 | 2 | 1 | 1 | 1 |

FIG. 6

MACROBLOCK LEVEL INTRAREFRESH TECHNIQUE FOR ENCODED VIDEO

FIELD OF THE INVENTION

The present application pertains to spatial and temporal video encoding and decoding.

BACKGROUND OF THE INVENTION

Video encoding is a commonly used technique for compressing video, i.e., reducing the amount of information needed to represent the video, for sake of conserving storage or transmission capacity. MPEG-2 is perhaps the most commonly used video encoding standard.

According to the MPEG-2 standard, each picture of a video sequence is divided into an m×n array of macroblocks. Each macroblock is a 2×2 array of blocks of luminance pixels, and each block of chrominance pixels overlaid thereon, wherein a block is an 8×8 array of pixels. Certain macroblocks are then motion compensated. A macroblock is motion compensated by identifying a prediction macroblock in another picture, called a reference picture, which closely resembles or matches the macroblock to be motion compensated. The prediction macroblock is then subtracted from the to-be-motion compensated macroblock. The prediction macroblock need not occupy precisely the same spatial coordinates as the to-be-motion compensated macroblock, and often there is a choice of reference pictures from which the prediction macroblock may be selected. A motion vector is used to identify the prediction macroblock by its spatial offset from the to-be-motion compensated macroblock and the reference picture in which it resides.

As noted above, the prediction macroblock is subtracted from the to-be-motion compensated macroblock to form a prediction error macroblock. The individual blocks of the prediction error macroblock are then spatially encoded. Some macroblocks are not motion compensated, either because a suitable prediction could not be found therefor or for refreshing purposes (defined below). Such macroblocks are said to be intracoded whereas macroblocks that are first motion compensated are said to be intercoded. The blocks of the intracoded and the interceded macroblocks are spatially compressed using the processes of discrete cosine transformation, quantization, (zig-zag or alternate) scanning, run-level encoding and variable length encoding. The macroblocks of selected pictures are also decoded and maintained in storage so that they can be used to reconstruct reference pictures for encoding other pictures. Decoded, reconstructed versions of the reference pictures are used for forming the predictions, in an effort to cause the encoder to use the same reconstructed reference pictures as are available to the decoder. However, for reasons described in greater detail below, the reference pictures reconstructed at the encoder will not always identically match the reference pictures in the decoder.

Pictures may be designated as one of three types, namely, intracoded (I) pictures, (forward only) predictively encoded (P) pictures and bidirectionally predictively encoded (B) pictures. I pictures contain only intracoded macroblocks. I pictures are used for random access, i.e., as an entry or cue point for presentation of video, as encoding may begin thereon. In addition, I pictures tend to reduce the propagation of errors and refresh the reference pictures in the decoder (as described in greater detail below). P pictures may contain both intracoded macroblocks and interceded macroblocks. However, the prediction macroblocks used to motion compensate the interceded macroblocks of a P picture may only originate in a reference picture which is presented before the P picture. B pictures may contain both intracoded and interceded macroblocks. Prediction macroblocks for B pictures may originate in a picture that is presented before the B picture, a picture that is presented after the B picture or an interpolation of the two. In order to reduce the memory requirements of a decoder which decodes B pictures, the reference pictures which are presented after the B picture are actually inserted into the encoded video signal before the B picture. The decoder can then easily decode the reference picture, that is to be presented after a given B picture, and have it available in advance of the arrival of the given B picture. As such, the reference picture is available for decoding the given B picture. I and P pictures may be used as reference pictures, but B pictures cannot be used as reference pictures.

The compressed video signal data formed using the above compression processes is formatted with header information and parameters inserted into the formatted video signal. In formatting the video signal, the video signal is hierarchically divided into the following layers: picture sequence, group of pictures, picture, slice, macroblock and block. The group of pictures and slice layers are optional. The group of pictures layer is useful for providing random access, as each group of pictures must start on an I picture. The slice layer is useful for providing error recovery. Each slice includes a contiguous sequence of adjacent macroblocks. Slices do not span more than one macroblock row but may include a variable length contiguous sequence of macroblocks in a given macroblock row. If an error is detected in the data of a slice, all subsequent data of that slice is either discarded or the errors in that slice are concealed using an error concealment process.

MPEG-2 supports both progressive and interlaced video. In the case of interlaced video, each macroblock of a frame can be selectively encoded as a frame macroblock or as two separate field macroblocks.

In the case of video conferencing, it is desirable to transmit low delay, low bit rate video signals. To reduce the delay, B pictures are preferably not used. This removes the latency associated with reordering pictures. (Recall that reference pictures that follow B pictures are inserted into the encoded video signal before the B pictures predicted from such reference pictures.) In addition, fields are coded as separate pictures. To reduce the bit rate, an I field picture is only used at the very beginning of the encoded video signal. Thereafter, each field picture is encoded as a P field picture. Since scene changes are unlikely to occur in video conference sessions, and the picture to picture motion is low, adequate video fidelity can be achieved, even at low bit rates and even though B pictures are not used.

As noted above, I pictures serve three purposes. One is providing random access, which is of low concern in a video conference. A second is to recover from errors, e.g., when the video signal is totally lost or partially corrupted. A third is to "refresh" the pictures—most notably, the portions of the (reference) pictures used for predicting other pictures.

Refreshing of pictures is of great concern in a video conference. Specifically, the discrete cosine transformers of encoders do not always match the inverse discrete cosine transformers of decoders, especially when made by different manufacturers. Thus, although both the encoder and the decoder use decoded reconstructed reference pictures to form predictions, a decoder might not produce precisely the same decoded reconstructed reference picture as the encoder. As a result, any prediction derived by the decoder from a reconstructed reference picture may diverge from (i.e., will have slightly different data than) the decoded, reconstructed reference picture used at the encoder to motion compensate subsequent pictures. The same is true of the decoded prediction error—the prediction error produced by the encoder may vary slightly from the prediction error decoded at the decoder. As such, a predicted picture decoded and reconstructed at a decoder will be slightly different than at the encoder. If this predicted picture is, in turn, used as a reference picture, then the divergence between the encoder and decoder reconstructed pictures will propagate and compound. Recall that a low bit rate video signal used in a video conference is formed as a sequence of a single I field picture followed by only P field pictures. Each P field picture will be predicted, at least in part, from a preceding P field picture. Thus, even if an error does not occur, intracoding is needed to prevent the propagating and compounding divergence of reconstructed pictures produced at the decoder relative to the reconstructed pictures produced at the encoder.

As noted above, it is preferable not to use I pictures (except at the very start) of a video conference application to maintain a low bit rate. Conventionally, a technique known as intra slice refresh is instead used in an attempt to alleviate the reference picture divergence problem. Specifically, slices are defined for each macroblock row. While MPEG-2 permits slices which span less than the full-width of a row, according to the intra slice refresh technique, each defined slice spans the entire width of the picture. A display screen can therefore display pictures which are each made up of a vertical sequence of contiguous slices (assuming that the display screen has the same dimensions as the picture). Over a fixed sequence of L>1 pictures, a different subset of slices is selected for refreshing. Each subset selected within a sequence of L pictures has slices with pixels at different row positions than each other subset selected within the same sequence of L pictures. Furthermore, the pixel rows of the slices of the intersection of all subsets over the sequence of L pictures includes each possible pixel row of the display screen. For example, one manner of selecting the subsets of slices is to select approximately P slices for refreshing each picture, where each selected slice in a picture is mutually vertically spaced from the closest other selected slices of that same picture. Thus, if the number of slice rows per field is 15 (vertically sequentially numbered 1 to 15), and P=4, then during the l=1 st picture, slices in rows 1, 5, 9 and 13 are refreshed. During the l=2nd picture, slices in rows 2, 6, 10 and 14 are refreshed. During the l=3rd picture, slices in rows 3, 7, 11 and 15 are refreshed. During the l=4th picture, slices in rows 4, 8 and 12 are refreshed. In short, over a sequence of L pictures, each row of pixels is refreshed exactly once. Stated another way, if the display screen can display a moving picture image formed by a sequence of displayed pictures, then over the sequence of L pictures, each row of pixels in the moving picture image is refreshed exactly once.

The intra slice refresh technique has drawbacks, however. First, as noted above, slices are designated for error isolation. Specifically, if an error is detected in a slice, each subsequent macroblock in a slice is discarded (or error concealment is applied to such macroblocks) until the next slice or layer is reached. By increasing the number of slices, the propagation of errors will be limited. However, this is not consistent with the primary purpose of intra slice refresh—the limiting of the divergence of reference pictures between the encoder and decoder.

Intra slice refresh does not accord well with interlaced pictures. Specifically, field pictures are often highly correlated within the same frame, especially in a low motion sequence of pictures as is typical in a video conference. Intra slice refreshing techniques do not consider this and tend to refresh each field component of a slice during different frames.

Moreover, the refreshing over a sequence of pictures by refreshing sequential full-length slices, that span the entire width of the frame, tends to produce a visible artifact. Often, this visible artifact appears as a visually discernible vertical scrolling band (corresponding to the refreshed slices) over the moving picture image.

Lastly, it should be noted that each slice begins with a slice header of a certain number of bits. Thus, a certain amount of overhead bits of the compressed video bitstream must be allocated specifically for such slice headers in order to perform the intra slice refresh technique. In other words, it would not be possible to omit the slice headers altogether (in all, or only certain, encoded pictures, for example, to conserve bandwidth) and still refresh using the intra slice refresh technique.

Accordingly, it is an object of the present invention to overcome the disadvantages of the prior art.

SUMMARY OF THE INVENTION

The present invention achieves this object as well as others. According to one embodiment, a method is provided for encoding K>1 sequentially presented video pictures. Each of the K pictures is divided into an m>1 row×n>1 column array of non-overlapping coding units of equal sizes. Each coding unit occupies a respective coding unit position in the picture from which it was divided. An arbitrary, pseudo random pattern of coding units is selected for refreshing during each of the K pictures. Each pattern selected during any given one of the K pictures includes a sequence of one or more coding units of the array. In addition, the pixels of each coding unit selected for refreshing during a $k^{th}$ picture occupy different pixel positions than each coding unit selected for refreshing during a preceding one of the $1^{st}$ to $(k-1)^{th}$ pictures of the K pictures. Furthermore, each pixel position of a moving picture image formed from the K pictures is selected for refreshing once over the sequence of K pictures.

Illustratively, the coding units are macroblocks and the coding unit positions are macroblock positions. Assume that the coding unit positions are sequentially ordered in a row-column direction, a coding unit position at one end of one row of the array, immediately preceding a coding unit position at the opposite end of an adjacent row, in the sequential ordering. Illustratively, during at least one of the K pictures, plural sequences of coding units of fixed length q are selected, where the first coding unit of each of the selected sequences is offset from the first coding unit of the next selected sequence by q·K coding unit positions. This can be achieved by initializing a length counter to a first constant and a frequency counter to a second constant. Then the following steps are performed during each of the K frames. If the length counter is equal to q then: (1) the length counter is set to the first constant; (2) the frequency counter is reset to the second constant minus one, if the frequency counter equals K; and (3) the next coding unit to be processed is counted according to the sequential ordering and the frequency counter is incremented. In any event, the length counter is incremented, and the next processed coding unit is selected for refreshing if the frequency counter is the second constant. Illustratively, q>1, q is an exact divisor of the number of coding units in each field of each frame and q is less than the number of coding units in a field. Also, K illustratively is free of a common divisor of the total number of coding units in each field of each frame, other than 1.

Illustratively, the K pictures are field pictures of interlaced frames, wherein each coding unit is an interlaced field coding unit. In such a case, spatially interleaved field coding units from a single given frame are refreshed during sequential pictures k, k+1 of the sequence of K pictures To that end, in addition to performing the above steps for each frame, the following step is performed for each field. If the last coding unit at the last field of the frame is reached, a frame counter is set equal to the frequency counter. If the last coding unit of a field other than the last field of the frame is reached, the frequency counter is set equal to the frame counter.

A system according to an embodiment includes a source of video pictures which are organized into an m×n array of coding units and an intra/inter decision circuit for selecting the coding units for refreshing over the sequence of K pictures.

The method or system according to the invention produces an encoded signal with the sequence of K>1 encoded pictures divided into coding units, where each of the pictures has the above-noted arbitrary pattern of refreshed coding units that are spatially only coded.

According to yet another embodiment, a storage medium is provided with storage areas for storing each of the encoded coding units of the K>1 pictures.

According to another embodiment, a method is provided for decoding a signal produced by the encoding method and system of the invention. Each coding unit is spatially decoded. Spatially decoded coding units, other than the coding units which were spatially only encoded, are added to predictions derived from reconstructed reference pictures. The reconstructed reference pictures formed from spatially only decoded coding units and coding units that were both spatially decoded and motion compensated are stored. Over the K pictures, a coding unit in each coding unit position of a moving picture image formed from the K pictures is reconstructed from a coding unit designated for refreshing, spatially only encoded, and spatially only decoded without data from another coding unit or picture.

According to another embodiment, a decoder apparatus is provided with a spatial decoder, for performing the spatial decoding, a motion compensator, for adding the spatially decoded coding units to predictions derived from reconstructed reference pictures, and a memory, for storing the reconstructed reference pictures.

BRIEF DESCRIPTION OF THE DRAWING

FIGS. 3–6 show refreshed macroblock positions according to the invention.

DETAILED DESCRIPTION OF THE INVENTION

This invention is illustrated herein using the MPEG-2 video encoding standard in a video conferencing application. As noted above, the MPEG-2 encoding process produces both intracoded data which is encoded without reference to predictions derived from decoded and reconstructed data, and intercoded data which is encoded with reference to predictions derived from decoded and reconstructed data. However, the invention is applicable in any application and using any encoding standard. In addition, the invention is also applicable for any type of refresh operations, not just a refresh operation achieved by selecting intracoding as opposed to intercoding. Also, the illustration below is for encoding frames as two field pictures. However, the invention is also applicable to encoding frames as frame pictures.

Figure 1:
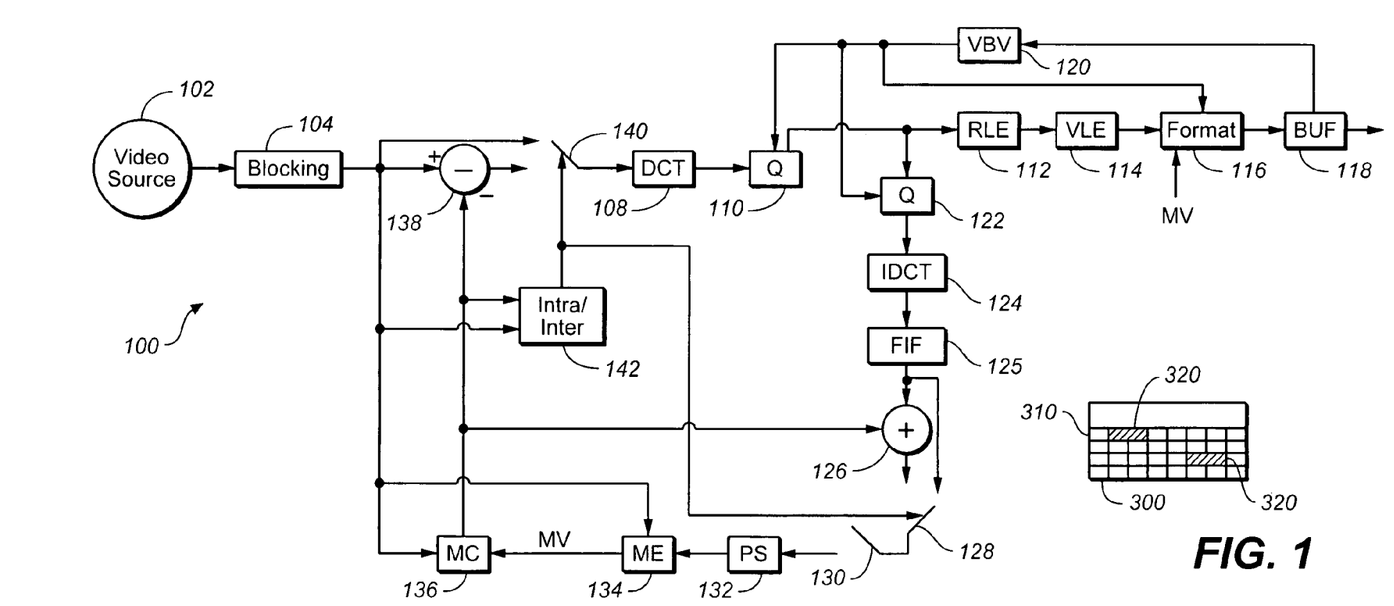
FIG. 1 shows an encoder according to an embodiment of the present invention.

FIG. 1 shows an encoder 100 according to an embodiment of the present invention. A video source 102 delivers a video signal to a blocking circuit 104. The blocking circuit 104 divides each picture (e.g., each frame) into and m×n array of macroblocks. For example, using a 4:2:0 color format, a 544H×480V frame is divided into m=15×n=34 field macroblocks for each of two fields, assuming that a field picture structure is used. Each macroblock is outputted to a subtractor 138, the purpose of which is described below. The difference formed by the subtractor 138, and each macroblock, are outputted to a switch 140 which selects one of the two macroblocks.

The blocks of the macroblock selected by the switch 140 are outputted to a discrete cosine transformer 108 which transforms the pixel data to coefficient data. Each block of coefficients is then quantized in the quantizer 110 using an appropriate quantizer scale factor chosen as described below. The quantized coefficients are scanned out into a sequence, run length encoded by run length encoder 112 and variable length encoded by variable length encoder 114. The formatter 116 then formats the compressed video signal and inserts appropriate header and parameter information. For example, the quantizer scale factors, the motion vectors and the macroblock header indicating the macroblock coding mode (all of which are described below) may be inserted into the video signal. The formatted video signal is then placed in a buffer 118 pending transmission or storage. The occupancy of the buffer 118 is monitored by a video buffer verifier 120, which adjusts, amongst other things, the quantization scale factor in an effort to prevent overflow and underflow of a decoder buffer modeled by the video buffer verifier 120. If adjusted, the quantizer scale factor is provided from the video buffer verifier 120 to the formatter 116 for insertion into the encoded video signal (as well as to the quantizer 110 and dequantizer 122).

Quantized coefficient data is also outputted from the quantizer 110 to a dequantizer 122 which also receives the quantizer scale factor from the video buffer verifier 120. The dequantizer 122 dequantizes the coefficients and provides them to an inverse discrete cosine transformer 124. The inverse discrete cosine transformer 124 transforms the dequantized coefficients to block pixel data. The macroblock pixel data is inputted to an adder 126, the purpose of which is described in greater detail below. The macroblock pixel data outputted from the adder 126 and the inverse discrete cosine transformer 124 are provided to a switch 128. The switch 128 selects one of these two macroblocks and outputs the selected macroblock to the switch 130. The switch 130 selectively stores the macroblock in the picture store 132 as part of a reconstructed picture. (Although not shown in greater detail, the macroblocks outputted from the switch 130 are stored in the appropriate field locations of the picture store 132 to reconstruct reference field pictures.) In short, the circuits 122, 124, 125, 126, 128, 130 and 132 decode and reconstruct selected pictures, most notably, reference pictures from the encoded video signal itself.

The reference pictures in the picture store 132 are used for motion compensating selected macroblocks. In particular, to-be-encoded macroblocks formed by the blocking circuit 104 are outputted to a motion estimator 134. The motion estimator 134 obtains a search window of pixels of a reference picture which search window is spatially centered relative to each to-be-encoded macroblock obtained from the blocking circuit 104. Using a block matching process, the motion estimator 134 extracts candidate prediction macroblocks at different spatial offsets from the to-be-encoded macroblock. The candidate macroblock most similar to the to-be-encoded macroblock is selected and a motion vector identifying the selected prediction macroblock is outputted to a motion compensator 136 and the formatter 116. Several different prediction macroblocks may be selected when more than one mode of motion compensation is permitted (e.g., field prediction, dual prime, 16×8 etc.) or a selection of reference pictures can be used for prediction. The motion compensator 136 evaluates each prediction macroblock and selects the prediction macroblock that produces the best prediction. The selected prediction macroblock is outputted to the subtractor 138 and the adder 126. In this fashion, the prediction macroblock is used to form the prediction error macroblock using the subtractor 138 and to recover the original macroblock from a decoded prediction error macroblock using the adder 126.

As noted above, the switch 140 is provided for selecting either the prediction error macroblock produced by the subtractor 138 or the macroblock itself outputted from the blocking circuit 104. Likewise, the switch 128 is provided for making the same selection for purposes of recovering the original macroblock depending on how it was encoded. This decision is the same as determining whether to intracode or intercode a macroblock. In the encoder 100, an inter/intra decision circuit 142 is provided for determining which of interceding or intracoding to apply to a to-be-encoded macroblock. Based on this decision, the intra/inter decision circuit 142 will throw the switches 140 and 128 to cause the appropriate form of encoding and decoding to take place. In addition, the intra/inter decision circuit 142 outputs an indication of which coding mode, i.e., which of intracoding and interceding was selected to the formatter 116 for insertion into the encoded video signal (e.g., as part of the macroblock header).

Illustratively, the video source 102 is a camera, video editor, video tape player, magnetic disk player, optical disc player or the like. The circuits 104–116, 120–130 and 134–142 illustratively are implemented using one or more video encoder circuits operating in concert. For example, the video encoder integrated circuits may be DVxper™ video encoder integrated circuits, distributed by C-Cube Microsystems, Inc.™, a company located in Milpitas, Calif. The picture store 132 and buffer 118 illustratively are implemented using a bank of one or more SDRAM integrated circuits. The video encoder integrated circuit(s) and memory may be connected together on an interface card installed in a desktop computer system or resident within a program encoder, such as the MediaView™, distributed by Divicom, Inc.™, a company located in Milpitas, Calif.

The signal produced by the video encoder 100 may be stored in storage areas 310, 320 of a stored medium (such as a magnetic tape, magnetic disk or optical disc). Storage areas 310 are provided for ordinary macroblocks (not specifically designated for refreshing) and storage areas 320 are provided for storing macroblocks designated for refreshing according to the invention.

Figure 2:
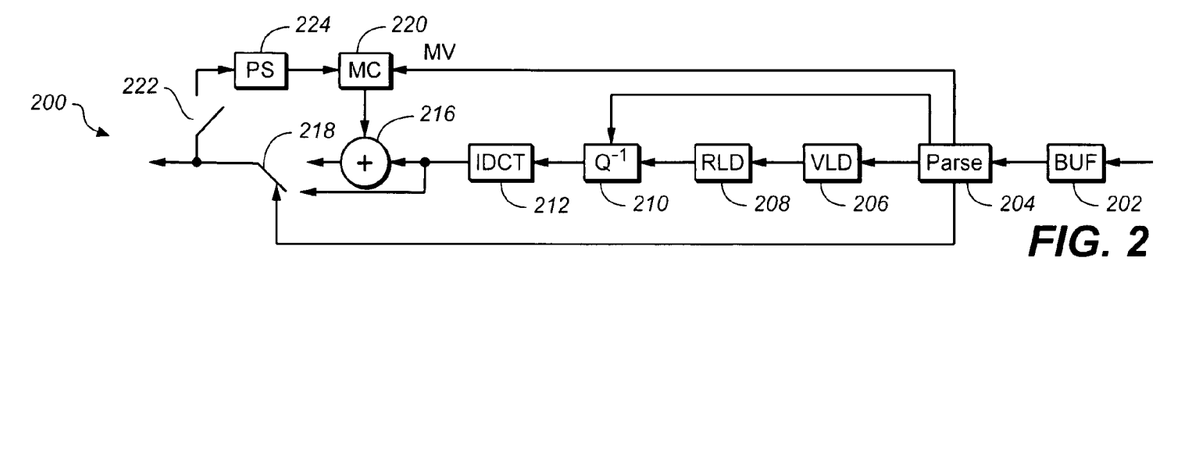
FIG. 2 shows a decoder according to an embodiment of the present invention.

FIG. 2 shows a decoder 200 according to an embodiment of the present invention. An encoded video signal received from a transmission media (e.g., directly from the encoder 100, or from the storage medium 300) is stored in a buffer 202 pending decoding. A parser 204 parses 15, the video signal and interprets header and parameter information contained in the video signal. For example, the parser 204 interprets the quantizer scale factor, motion vector and macroblock header (which, among other things, indicates the macroblock coding mode) inserted in the encoded video signal. Such parameters are outputted to the respective decoding circuits, e.g., circuits 210, 218, 220, 222, and 224, for performing an indicated function or adjustment. The video signal is then variable length decoded by the variable length decoder 206 and run level decoded by the run level decoder 208. The run-level decoded video data is inverse scanned back into blocks which are dequantized by the dequantizer 210 according to the quantizer scale factors outputted from the parser 204. The dequantized blocks of coefficients are then transformed into block pixel data by the inverse discrete cosine transformer 212. The blocks are rearranged into spatially decoded macroblocks and outputted to the adder 216 and the switch 218. (Note that the circuits 206, 208, 210, 212 and 214 serve as a spatial decoder). Under control of the macroblock coding decision indication parsed from the encoded video signal by the parser 204, the switch 218 selects either the output of the adder 216 or the output of the inverse discrete cosine transformer 212 (i.e., selects the spatially only decoded macroblock or the macroblock which is both spatially decoded and motion compensated). The motion vector parsed by the parser 204 is received by the motion compensator 220. In response, the motion compensator 220 retrieves the appropriate prediction macroblock from the picture store 224 for output to the adder 216. The macroblock selected by the switch 218 is outputted for presentation (i.e., display). In addition, the switch 222 selectively causes decoded reconstructed macroblocks to be stored in reference pictures in the picture store 222. Again, although not shown in detail, reconstructed macroblocks are stored in the appropriate storage areas to reconstruct reference field pictures.

Illustratively, circuits 204–222 of the decoder are implemented using a decoder integrated circuit such as the ZiVA™ or the AViA™ decoder integrated circuits distributed by C-Cube Microsystems, Inc. Alternatively, a single DVxpert™ video encoder integrated circuit provides sufficient processing capacity to perform both encoding and decoding in some video conferencing applications. The buffer 202 and the picture store 224 illustratively are implemented using a bank of SDRAM integrated circuits.

As noted above, in a video conference, B pictures illustratively are not used. In addition, only the first field picture is coded as an I field picture. Each subsequent field picture is coded as a P field picture, i.e., IPPPPP . . . . As further noted above, portions of the moving picture image formed from the encoded pictures must be periodically refreshed to prevent a compounded divergence between reconstructed pictures at the encoder 100 (stored in picture store 132) and reconstructed pictures at the decoder 200 (stored in picture store 224). Although the intra slice refresh technique may be used to cause each macroblock in successive slices to be refreshed (i.e., intracoded or spatially only encoded), this has the disadvantages noted above. According to an embodiment of the invention, refreshing is performed over a sequence of K pictures on a macroblock by macroblock basis, not a slice by slice basis. In addition, the macroblocks selected for refreshing are located at arbitrary or (pseudo) random macroblock positions. As before, over a sequence of K pictures, a macroblock in each macroblock position of the moving picture image is refreshed. However, instead of selecting an entire row of macroblocks, the macroblocks are selected more randomly and independently of the slice structure (which slice structure may be omitted altogether). Simply stated, the selection of portions of the picture for refreshing is made at the macroblock layer, not the slice layer. Moving the selection to the macroblock layer is sensible, as the macroblock is the coding unit at which intra/inter coding is already made. Moreover, making the refreshing selection at a layer other than the slice layer in an arbitrary or (pseudo) random fashion tends to avoid visual artifacts, most notably, the above-noted visually discernable scrolling band. In addition, since the refreshing is done independently of the slices, the frequency of inserting slices can be made independent of the refresh frequency, if slices are inserted at all. Thus, error resiliency is independent of the refresh frequency and no "overhead" slice header bits need be allocated for purposes of effecting refreshing.

According to the invention, a particular type of arbitrary or pseudo random pattern may be used over a sequence of K frames. The selection of the pseudo random pattern illustratively is made by the intra/inter decision circuit 142. If such a circuit 142 is implemented by a suitably programmed processor, then the selection of the arbitrary or pseudo random pattern preferably is performed within the macroblock coding mode decision process.

The term "arbitrary pattern" refers to a decorrelation of the specific macroblocks selected for refreshing which reduces the ability to perceive a visual artifact, such as the above-described visually discernable scrolling band. According to the invention, one or more sequences of macroblocks are selected for refreshing during each picture. These sequences are decorrelated from each other from picture to picture over the sequence of K pictures. For example, each sequence selected for refreshing begins at a macroblock position offset from the leftmost macroblock position of the picture by one or more macroblocks, ends at a macroblock position offset from the rightmost macroblock position of the picture by one or more macroblocks, or both. This means that in at least one row containing macroblocks of any given sequence selected for refreshing, at least one macroblock in the same row is not selected for refreshing. As may be appreciated, this is in contrast to the prior art intra slice refresh technique, where each sequence of macroblocks selected for refreshing spans one entire macroblock row. Each such intra slice begins at the leftmost macroblock position and ends at the rightmost macroblock position, and therefore includes each macroblock in any row in which the intra slice is located. By avoiding this very ordered, full macroblock row width intra slice pattern, using the arbitrary pattern set forth above, the invention avoids the discernable vertically scrolling band that plagues the intra slice refresh technique. To achieve the above arbitrary pattern, the sequence of macroblocks selected for refreshing can be made to have a different length than the number of macroblocks in a row, or an appropriate macroblock position offset can be chosen for selecting each sequence or both. In another example, the particular columns at which each refreshing sequence of macroblocks begins and ends varies from picture to picture. Thus, no visually discernable pattern is formed by virtue of the refresh process.

The invention is illustrated herein for one sequence of K pictures. Preferably, the invention is successively applied to each of multiple sequences of K pictures over the course of a video program. For example, all pictures of the video program are divided into successive sequences of K pictures (possibly ending with a sequence of less than K pictures, to which the invention is only applied in part, if the video program does not have an integral multiple of K pictures), and each sequence of K pictures is processed as described below. Of course, the pictures of the video program also can be divided into multiple disjoint sequences of K pictures separated by sequences of one or more video pictures to which no refreshing is applied or to which refreshing according to another technique is applied.

The following is an illustrative sequence of steps performed in generating the arbitrary or pseudo random macroblock refresh pattern:

```
1. Initialization code
       /* Refresh_MB_Length counts the number of macroblocks in a sequence of     */
       /* macroblocks to be refreshed or separating refreshed macroblock sequences. */
       /* Refresh_Count counts the number of sequences of                          */
       /* macroblocks (of length SEQ_LEN) not designated for refreshing between    */
       /* sequences of refreshed                                                    */
       /* macroblocks in a picture.                                                 */
       Refresh_MB_Length = 0;
       Refresh_Count = 1;
2. Intra refresh check code
       /* Have we counted a SEQ_LEN length sequence of adjacent                    */
       /* macroblocks? If so, then reset the counter.                              */
       if (Refresh_MB_Length == SEQ_LEN)
       {
           Refresh_MB_Length = 0;
           /* Have we counted REF_RATE_CONST macroblock sequences                  */
           /* not designated for refreshing                                        */
           /* between sequences of refreshed macroblocks? If so, reset the counter. */
           if (Refresh_Count == REF_RATE_CONST)
               Refresh_Count = 0;
           /* Increment the macroblock sequence counter for this macroblock sequence */
           /* which we are currently processing.                                   */
           Refresh_Count++;
       }
       /* Count the currently processed macroblock as a macroblock of a refreshed or */
       /* non-refreshed sequence.                                                   */
       Refresh_MB_Length++;
       /* Is the currently processed macroblock part of a refreshed sequence       */
       /* (Refresh_Count == 1)? If so, then refresh this macroblock by choosing to */
       /* spatially only encode it (intracode). If not, then use ordinary macroblock mode */
```

```
        /* selection process (not shown) for choosing the macroblock encoding mode.   */
        If (Refresh_Count == 1)
            Macroblock_Mode = intra;
3. End of field
    if (last field of frame)
        /* Save the count used in the first field at the beginning of the next frame   */
        /* for use in selecting the coding mode for the second field of the frame      */
        Frame_Refresh_Count = Refresh_Count
    else
        /* Reset the count at the beginning of the second field of the frame to the    */
        /* same count value as at the beginning of the first field of the same frame   */
        Refresh_Count = Frame_Refresh_Count;
```

The above process can be summarized as follows. Assume that each macroblock of each field of K>1 frames is sequentially ordinaled (ordered) in, for example, row-column order. For example, starting from the upper left hand corner, the macroblocks of a moving picture image are ordered from $1^{st}$ to $n^{th}$ across the top row, then from $(n+1)^{th}$ to $2n^{th}$ across the second to topmost row, . . . , and then from $(m-1)(n+1)^{th}$ to $mn^{th}$ across the bottom macroblock row. Given such an ordering, the macroblocks are organized into fixed length ordinal sequences of length q (SEQ_LEN), where $m \cdot n > q > 1$, and q is an exact divisor of the total number $m \cdot n$ of macroblocks in the moving picture image. In any given one of the K>1 frames, multiple sequences are selected for refreshing which are non-adjacent, in fact, separated by K-1 (REF_RATE_CONST-1) number of sequences not selected for refreshing in that same picture. (Here sequences are adjacent if they are consecutively ordinaled, but sequences of one or more macroblocks are not adjacent if they are interleaved, as in the case of interlaced sequences in different fields.) The sequence separation is counted in ordinal order modulo men, and the current count is carried forward from frame to frame. K is selected to be a number greater than 1 and devoid of a common divisor (except 1) with the value $m \cdot n/q$, namely, the quotient of the total number of macroblocks in the moving picture image divided by the number of macroblocks in a sequence. Such a selection ensures that the same sequence is never selected twice for refreshing over K frames, but that each macroblock position of the moving picture image formed from the K frames is refreshed exactly once.

In addition, if a particular sequence of macroblocks in one field is selected for refreshing then the counterpart spatially overlapping sequence, interlaced therewith, in the other field is also selected for refreshing. To achieve this, the Refresh_Count at the end of the last field of a frame is temporarily stored (in the temporary variable Frame_Refresh_Count). After selecting sequences of macroblocks for refreshing in the first field of a frame, the temporarily stored count is restored so that the second field of the same frame selects the same sequences.

Figure 3:
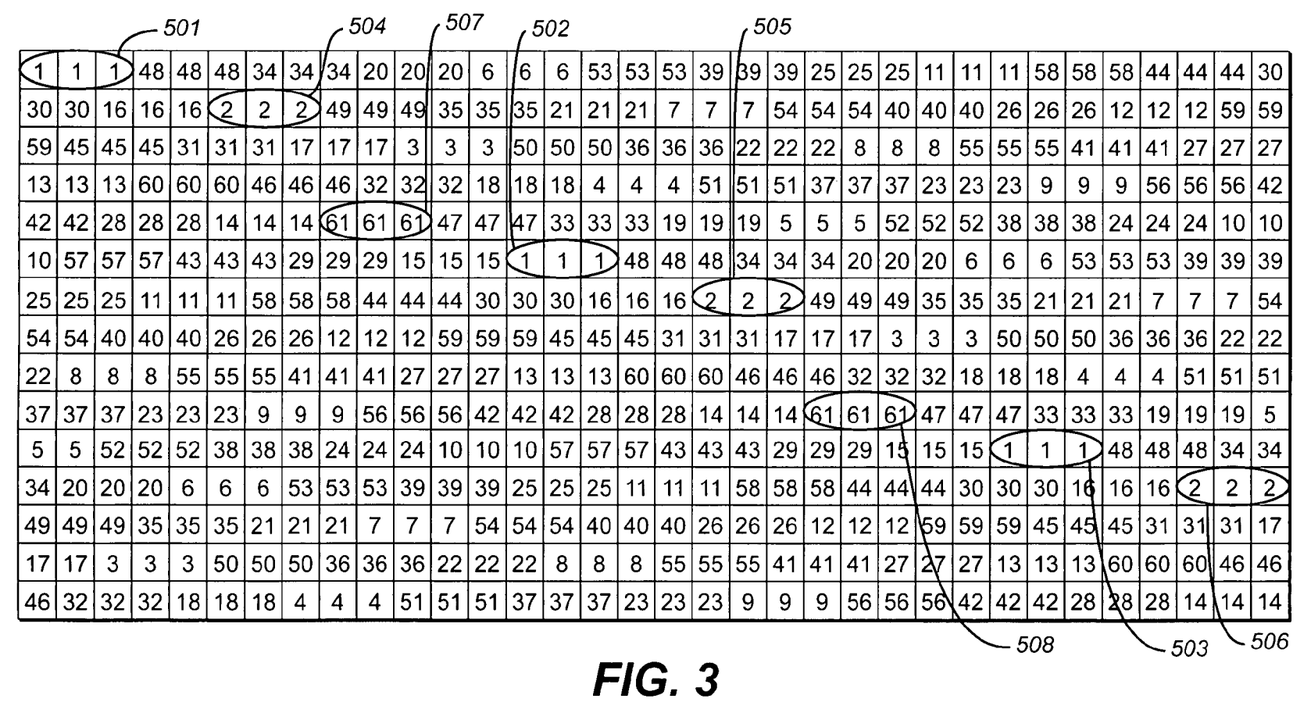
Figure 4:
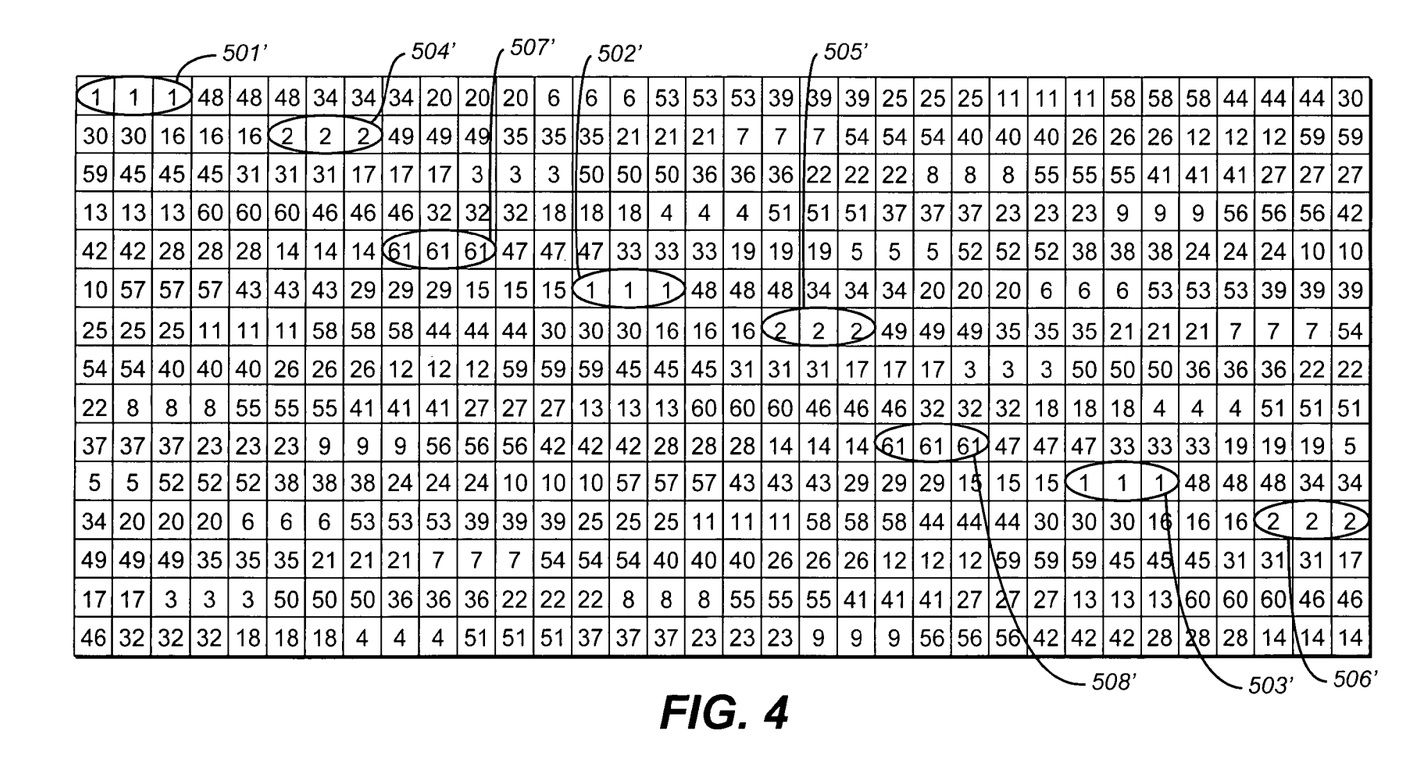

Consider now an example shown in FIGS. 3 and 4. FIGS. 3 and 4 show the moving picture image fields formed from a sequence of frames according to the invention having frame dimensions of 544×480 pixels. Each field has 544×240 pixels or 34×15 field macroblock positions (again, assuming that each frame is encoded as two field pictures). The values of q (SEQ_LEN)=3 and K (REF_RATE_CONSTANT)=61 are used. In the $k=1^{st}$ frame, the three sequences (501, 502, 503) or (501', 502', 503') at macroblock positions 1, 184 and 367, respectively, of both the top and bottom fields are selected for refreshing. In the $k=2^{nd}$ frame, the sequences (504, 505, 506) or (504', 505', 506') beginning at macroblock positions 40, 223 and 406, respectively, of both the top and bottom fields are selected for refreshing. (Note that 367+183 modulo 510=40.) In the $k=61^{st}$ frame, the sequences (507, 508) or (507', 508') beginning at macroblock positions 145 and 328, respectively, of both the top and bottom fields are selected for refreshing. (Note that 328+183 modulo 510=1, the starting position for the first refreshed sequence in the next group of K=61 frames.) Note that each macroblock position is refreshed exactly once over K frames, in a pseudo random pattern.

Consider now the example shown in FIGS. 5 and 6. FIGS. 5 and 6 show the moving picture image fields for a frame having dimensions 320×480 pixels. In this case m=20 and n=15 for each of the two constituent fields. Here q (SEQ_LEN) is again chosen as 3 but K (REF_RATE_CONST) is chosen to be 33.

The above discussion is merely illustrative of the invention. Those skilled in the art may devise numerous alternative embodiments without departing from the spirit and scope of the invention.

The claimed invention is:

1. A method for encoding K>1 pictures of video, comprising the steps of:
    (a) dividing each of said K pictures into an m>1 row by an n>1 column array of coding units;
    (b) selecting a pseudo random pattern of said coding units for refreshing during each of said K pictures, each of said pseudo random patterns selected during any given one of said K pictures including a sequence of one or more of said coding units; and
    (c) during at least one of said K pictures, selecting a plurality of said sequences of a fixed length q with said sequences being offset from each other by q·K,
    wherein (i) each of said coding units selected for refreshing during a $k^{th}$ picture of said K pictures occupy different positions than each of said coding units selected for refreshing during a preceding one of a $1^{st}$ to a $(k-1)^{th}$ pictures of said K pictures and (ii) each of said positions from said K pictures is selected for refreshing once over said K pictures.

2. The method of claim 1, wherein said coding units are macroblocks and said positions are macroblock positions.

3. The method of claim 1, further comprising the steps of:
    initializing a length counter to a first constant and a frequency counter to a second constant; and
    during each of said K pictures:
        if said length counter is equal to a fixed length q then
            (i) setting said length counter to said first constant,
            (ii) resetting said frequency counter to said second constant minus one if said frequency counter equals K and (iii) incrementing said frequency counter;

counting a next to-be-processed coding unit of said coding units in sequential order and incrementing said length counter for said next to-be-processed coding unit; and selecting said next to-be-processed coding unit for refreshing if said frequency counter is said second constant.

4. The method of claim 3, wherein said K pictures are a plurality of field pictures of a plurality of interlaced frames, each of said coding units is an interlaced field coding unit and said interlaced field coding units from a single given frame of said interlaced frames are refreshed during sequential pictures k and k+1 of said K pictures, the method further comprising the steps of:

if a last of said coding units at a last of said field pictures of one of said interlaced frames is reached, setting a frame counter equal to said frequency counter; and if said last coding unit is reached, setting said frequency counter equal to said frame counter.

5. The method of claim 1, wherein a fixed length q for a plurality of said sequences is (i) an exact divisor of a number of said coding units in each of said K pictures, (ii) less than said number of said coding units in each of said K pictures and (iii) greater than one.

6. The method of claim 5 wherein K is free of a common divisor with m·n/q, other than 1.

7. The method of claim 1, wherein each of said K pictures is a field picture of an interlaced frame, each of said coding units is an interlaced field coding unit and said interlaced field coding units from a single given frame of said interlaced frames are refreshed during sequential pictures k and k+1 of said K pictures.

8. The method of claim 1, wherein said pseudo random patterns are decorrelated among said K pictures.

9. The method of claim 8, wherein a starting and an ending coding unit of said coding units in each of a plurality of said sequences within each of said K pictures are located in different columns of said array over successive ones of said K pictures.

10. The method of claim 8, wherein (i) at least a first one of said sequences starts at a first position of said positions which is offset from a leftmost position of said positions in a first row of said array containing a beginning of said first sequence by one or more of said positions and (ii) a second one of said sequences ends at a second position of said positions which is offset from a rightmost position of said positions in a second row of said array containing an end of said second sequence by one or more of said positions.

11. A storage medium for storing a video signal configured to execute the steps of claim 1.

12. An apparatus comprising:

a source for supplying K>1 pictures of video, each divided into an m>1 row by an n>1 column array of coding units; and an inter/intra decision circuit for selecting a pseudo random pattern of said coding units for refreshing during each of said K pictures, each of said pseudo random patterns selected during any given one of said K pictures including a sequence of one or more of said coding units, wherein (i) each of said coding units selected for refreshing during a $k^{th}$ picture of said K pictures occupy different positions than each of said coding units selected for refreshing during a preceding one of a $1^{st}$ to a $(k-1)^{th}$ pictures of said K pictures, (ii) each of said positions from said K pictures is selected for refreshing once over said K pictures and (iii) said inter/intra decision circuit is also for, during at least one of said K pictures, selecting a plurality of said sequences of a fixed length q with said sequences being spaced from each other by q·K of said positions.

13. The apparatus of claim 12, wherein said coding units are macroblocks and said positions are macroblock positions.

14. The apparatus of claim 12, wherein the inter/intra decision circuit is also for:

initializing a length counter to a first constant and a frequency counter to a second constant; and during each of said K pictures:

if said length counter is equal to q then (i) setting said length counter to said first constant, (ii) resetting the frequency counter to the second constant minus one, if the frequency counter equals K and (iii) incrementing said frequency counter;

counting a next to-be-processed coding unit of said coding units in sequential order and incrementing said length counter for said next to-be-processed coding unit; and selecting said next to-be-processed coding unit for refreshing if said frequency counter is said second constant.

15. The apparatus of claim 14, wherein each of said K pictures is a field picture of an interlaced frame, each of said coding units is an interlaced field coding unit and said interlaced field coding units from a single given frame of said interlaced frames are refreshed during sequential pictures k and k+1 of said K pictures, wherein said inter/intra decision circuit is also for:

if a last of said coding units at a last of said field pictures of one of said interlaced frames is reached, setting a frame counter equal to said frequency counter; and if said last coding unit is reached, setting said frequency counter equal to said frame counter.

16. The apparatus of claim 12, wherein a fixed length q for a plurality of said sequences is (i) an exact divisor of a number of said coding units in each of said K pictures, (ii) less than said number of said coding units in each of said K pictures and (iii) greater than one.

17. The apparatus of claim 16 wherein K is free of a common divisor with m·n/q, other than 1.

18. The apparatus of claim 12, wherein each of said K pictures is a field picture of an interlaced frame, each of said coding units is an interlaced field coding unit and said interlaced field coding units from a single given frame of said interlaced frames are refreshed during sequential pictures k and k+1 of said K pictures.

19. The apparatus of claim 12, wherein said pseudo random patterns are decorrelated among said K pictures.

20. The apparatus of claim 19, wherein a starting and an ending coding unit of said coding units in each of a plurality of said sequences within each of said K pictures are located in different columns of said array over successive ones of said K pictures.

21. The apparatus of claim 19, wherein (i) at least a first one of said sequences starts at a first position of said positions which is offset from a leftmost position of said positions in a first row of said array containing a beginning of said first sequence by one or more of said positions and (ii) a second one of said sequences ends at a second position of said positions which is offset from a rightmost position of said positions in a second row of said array containing an end of said second sequence by one or more of said positions.

22. A method for encoding K>1 pictures of video, comprising the steps of:
   (a) dividing each of said K pictures into an m>1 row by an n>1 column array of coding units;
   (b) selecting a pseudo random pattern of said coding units for refreshing during each of said K pictures, each of said pseudo random patterns selected during any given one of said K pictures including a sequence of one or more of said coding units;
   (c) initializing a length counter to a first constant and a frequency counter to a second constant; and
   (c) during each of said K pictures:
      if said length counter is equal to a fixed length q then (i) setting said length counter to said first constant, (ii) resetting said frequency counter to said second constant minus one if said frequency counter equals K and (iii) incrementing said frequency counter;
      counting a next to-be-processed coding unit of said coding units in sequential order and incrementing said length counter for said next to-be-processed coding unit; and
      selecting said next to-be-processed coding unit for refreshing if said frequency counter is said second constant,
   wherein (i) each of said coding units selected for refreshing during a $k^{th}$ picture of said K pictures occupy different positions than each of said coding units selected for refreshing during a preceding one of a $1^{st}$ to a $(k-1)^{th}$ pictures of said K pictures and (ii) each of said positions from said K pictures is selected for refreshing once over said K pictures.

23. An apparatus comprising:
   a source for supplying K>1 pictures of video, each divided into an m>1 row by an n>1 column array of coding units;
   an inter/intra decision circuit for selecting a pseudo random pattern of said coding units for refreshing during each of said K pictures, each of said pseudo random patterns selected during any given one of said K pictures including a sequence of one or more of said coding units,
   wherein (i) each of said coding units selected for refreshing during a $k^{th}$ picture of said K pictures occupy different positions than each of said coding units selected for refreshing during a preceding one of a $1^{st}$ to a $(k-1)^{th}$ pictures of said K pictures, (ii) each of said positions from said K pictures is selected for refreshing once over said K pictures, and (iii) said inter/intra decision circuit is for:
   initializing a length counter to a first constant and a frequency counter to a second constant; and
   during each of said K pictures:
      if said length counter is equal to q then (i) setting said length counter to said first constant, (ii) resetting the frequency counter to the second constant minus one, if the frequency counter equals K and (iii) incrementing said frequency counter;
      counting a next to-be-processed coding unit of said coding units in sequential order and incrementing said length counter for said next to-be-processed coding unit; and
   selecting said next to-be-processed coding unit for refreshing if said frequency counter is said second constant.

* * * * *